United States Patent [19]
Focke et al.

[11] Patent Number: 5,088,883
[45] Date of Patent: Feb. 18, 1992

[54] APPARATUS FOR LIFTING ARTICLES, ESPECIALLY PACKS, FOR FORMING DISCHARGEABLE STACKS

[75] Inventors: Heinz Focke, Verden; Uwe Dreyer, Wuppertal, both of Fed. Rep. of Germany

[73] Assignee: Focke & Co. (GmbH & Co.), Verden, Fed. Rep. of Germany

[21] Appl. No.: 519,986

[22] Filed: May 1, 1990

[30] Foreign Application Priority Data

May 12, 1989 [DE] Fed. Rep. of Germany ....... 3915600

[51] Int. Cl.⁵ .............................................. B65G 57/30
[52] U.S. Cl. ........................................ 414/795; 74/51; 74/52; 74/106; 74/665 GA; 414/790.3; 414/795.3
[58] Field of Search ............. 74/665 GA, 51, 52, 106; 414/288.8, 790.3, 795, 795.3, 797.7

[56] References Cited
U.S. PATENT DOCUMENTS 3,387,719  6/1968  Moore ........................... 414/795 X
4,955,783  9/1990  Grazia ............................... 414/795

FOREIGN PATENT DOCUMENTS 1127810  4/1962  Fed. Rep. of Germany .
1586258  4/1970  Fed. Rep. of Germany .
2206437  8/1973  Fed. Rep. of Germany .
2713205  9/1978  Fed. Rep. of Germany .
0100025  6/1983  Japan .............................. 414/795
1352664  5/1974  United Kingdom .

Primary Examiner—Robert J. Spar
Assistant Examiner—Janice Krizek
Attorney, Agent, or Firm—Sughrue, Mion, Zinn, Macpeak & Seas

[57] ABSTRACT

An apparatus has on each side of a conveyor (12) a rotating conveying segment (16, 17) for lifting packs from the conveyor (12) to form a stack (13) of packs (11). An oscillating holding segment (18, 19) oscillates about a common axis with each conveying segment (16, 17) but at a lesser radial distance from the axis then the conveying segment. The holding segments hold the stack (13), but separate to permit a new pack (11) to be added to the bottom of the stack.

9 Claims, 4 Drawing Sheets

APPARATUS FOR LIFTING ARTICLES, ESPECIALLY PACKS, FOR FORMING DISCHARGEABLE STACKS

BACKGROUND OF THE INVENTION

The invention relates to an apparatus for lifting articles, especially packs, for forming dischargeable stacks from packs delivered on a conveyor.

In many different fields of the packaging technique it can be necessary to lift and vertically stack packs or the like. It is of particular advantage to form individual pack groups, from which pack bundles can then be produced by means of packing machines. The pack bundles consist either a of several individual packs of single-layered arrangement being connected by an outer wrapping or they consist of pack rows of double- or multi-layered arrangement, like for instance those of paper tissue packs.

An apparatus of the afore-described species is already known from DE-OS 2 206 437 (corresponding to U.S. Pat. No. 3,837,504). The apparatus disclosed in this publication, however, has the disadvantage of being of relatively complicated construction and having longitudinally shiftable parts in addition to rotating parts for lifting the packs.

DE-AS 1 127 810 teaches an apparatus wherein the packs are solely held by frictional forces with brushes arranged in vertical direction of the stacking channel engaging the side walls of the packs. Such a frictional fixing of the packs has in practical operation proved to be insecure and prone to cause operating failures. Moreover, a high driving power is needed for overcoming the frictional forces. Such a solution in particular limits the range of application of such apparatuses to light and dimensionally stable packs.

SUMMARY OF THE INVENTION

The invention is based on the object to create an apparatus of the afore-described class using relatively simple means while guaranteeing a continuous operation being highly reliable even at high working speeds and even when the most different articles, especially packs, are used.

In order to attain this object, the invention envisions arranging on both sides of the conveyor a rotating conveying segment each for lifting the packs and coaxially thereto a holding segment each oscillating below said conveying segments for holding the stacks particularly ensures a safe positive positioning of the articles during all lifting phases, so that for instance the stack of packs is always at the proper height for being discharged.

The conveying and the holding segments are expediently formed in the shape of a segment of a circular ring and each extends across an angle of about 90°. This design has the surprising effect to always create enough space for the packs passed through at regular intervals during the coordinated rotating and pivoting movements of the segments, in spite of the exceedingly space-saving type of construction.

It proved to be of advantage to provide the holding segments at their inner ends with slopes led inwardly from the outer edges. These slopes ensure that the stack of packs slides off the holding segments pivoting away to the side without any impulsive movement softly and gently down onto the lowermost pack lifted by the conveying segments.

The packs can be lifted particularly gently in an expedient way by providing the conveying segments at their front ends gripping underneath the packs with curvatures, so that said conveying segments pick up the packs at their bottom side with a soft and sliding rolling motion, thus treating the packs gently.

The slopes extending at the back ends of the conveying segments inwardly from the outer edges ensure that the packs slide off the rotating conveying segments without any impulsive movement softly and gently onto the holding segments. The stack carries out a continuous pulsating up and down movement.

Since the conveying segments are arranged on tubular shafts driven directly by a rotating main shaft of the apparatus and since the holding segments are arranged on shafts disposed coaxially within the hollow shafts which are driven for oscillation by the main shaft, the apparatus as defined by the invention only requires a relatively small industrial instrumentation and can be produced cost-effectively.

This applies even more so, if the shafts with the holding segments arranged within the hollow shafts are driven for oscillation by the main shaft via a crank arm, an articulated coupler and a double arm which is articulated unilaterally on a fixed point and which eccentrically engages an oscillating cogwheel.

A further advantageous embodiment provides that the cogs wheel driven for oscillation is in direct engagement with a cogwheel on the shaft of one holding segment and contrarotatingly drives a cogwheel on the shaft of the other holding segment via an interposed cogwheel.

The stack formed by the packs can be pushed off by means of a pusher. The packs are always exactly positioned relative to the pusher even at high operating speeds due to the segments positively gripping and holding the packs. Operating faults are therefore avoided in this area as well.

An exemplary embodiment is described in more detail below with reference to the drawings which show:

DETAILED DESCRIPTION OF A PREFERRED EMBODIMENT

Figure 1:
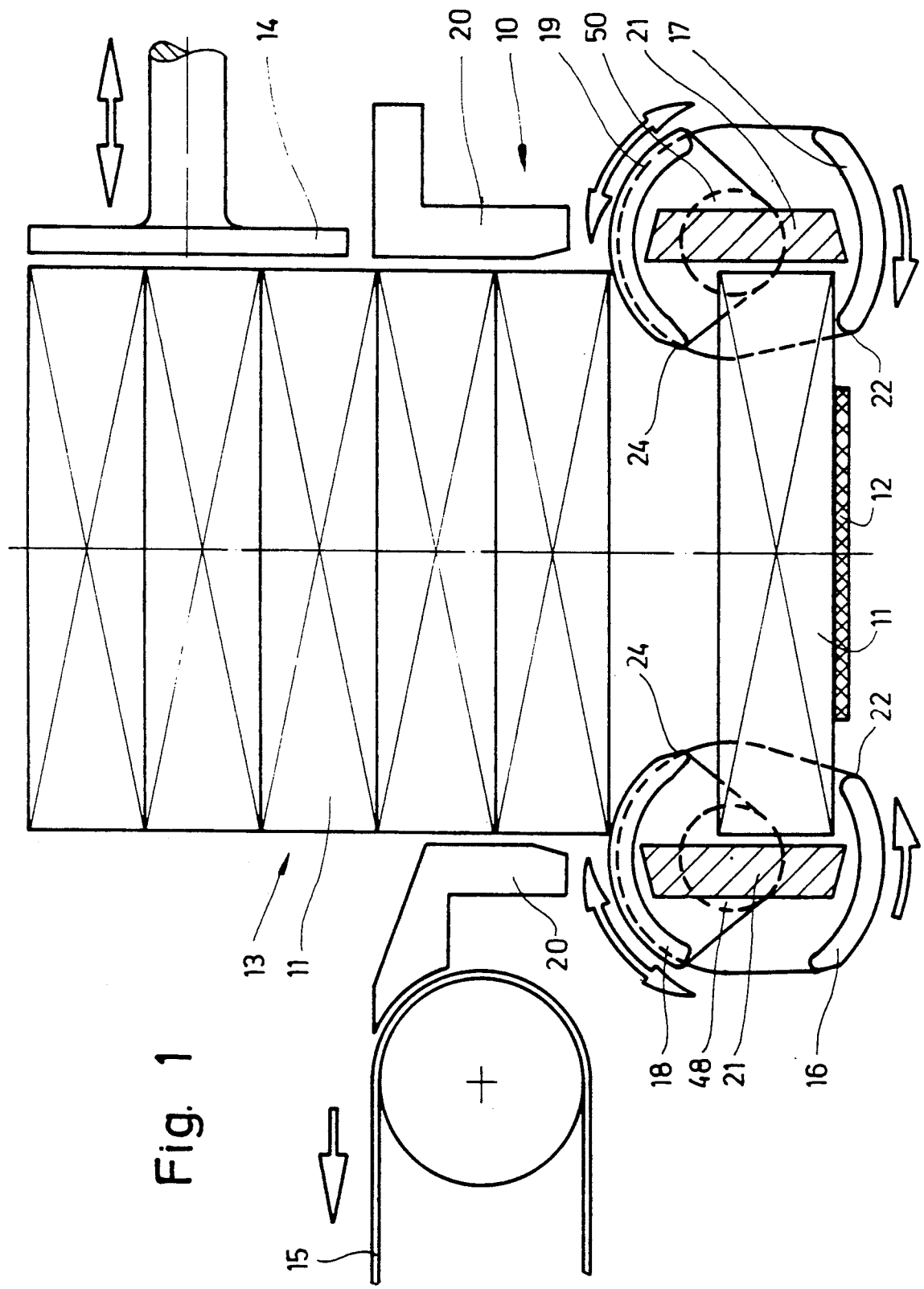
FIG. 1 a schematic elevational view of the apparatus.
Figure 2D:
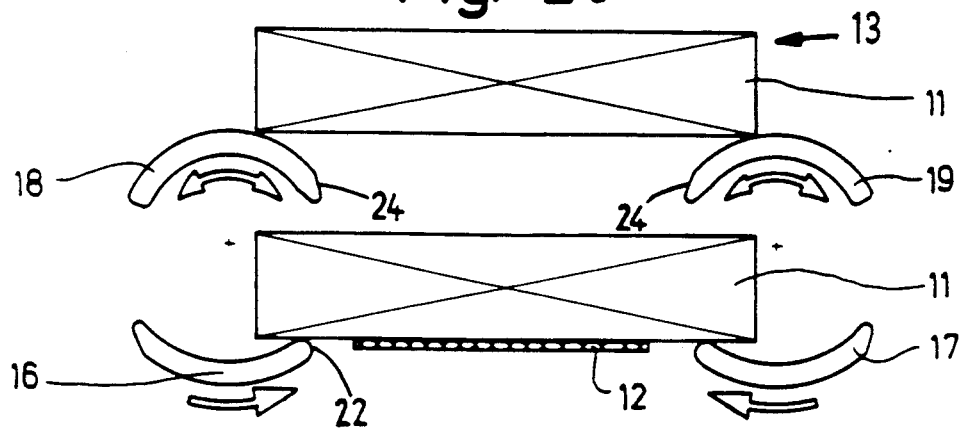
FIGS. 2a-2d a schematic representation of the mode of operation of the apparatus according to FIG. 1, FIG. 3 a cross-section of the apparatus according to FIG. 1, FIG. 4 a section of the apparatus taken along the line A—A in FIG. 3.
Figure 2C:
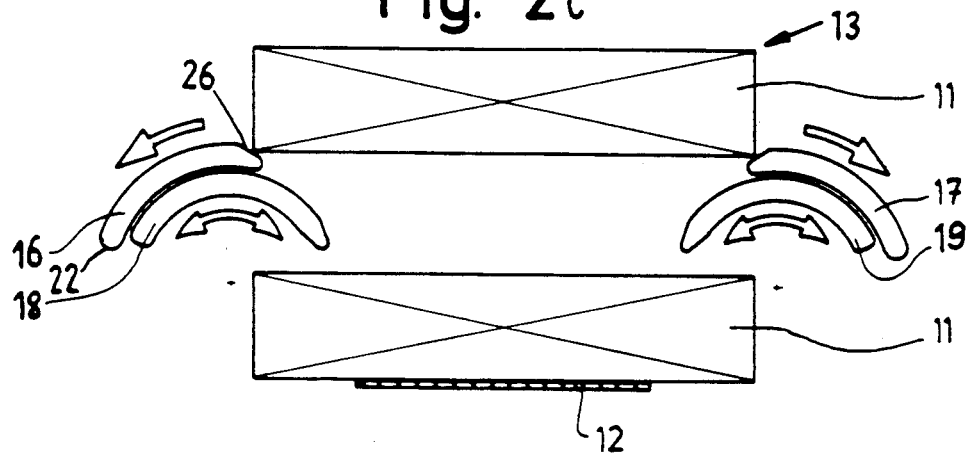
Figure 2B:
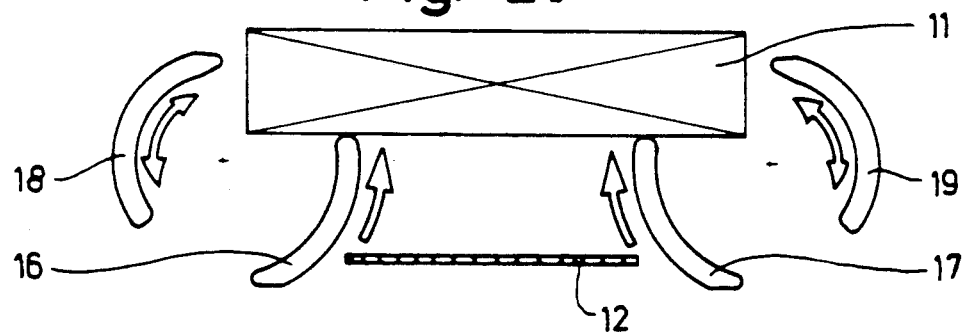
Figure 2A:
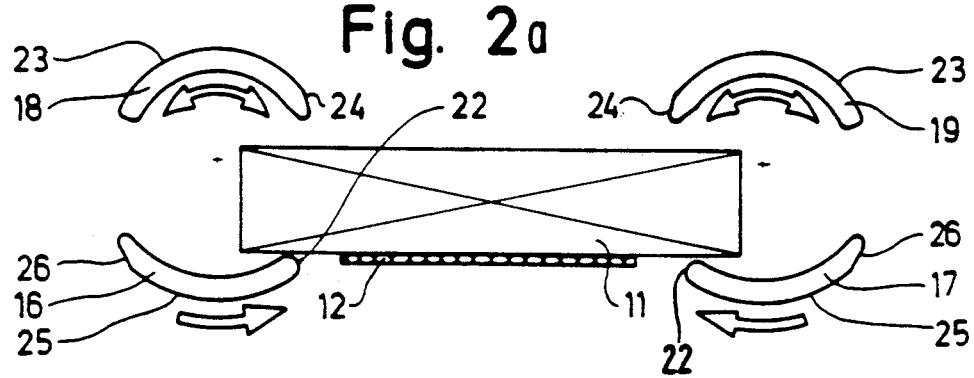

The shown embodiment is concerned with forming stacks 13 by means of the apparatus designated by numeral 10 from packs 11 and also from rows of several packs 11 arranged behind one another which are delivered on a conveyor 12 in the form of a conveyor belt to the apparatus 10. The stacks 13 are formed by successively lifting the packs 11 or pack rows which are lifted off the conveyor 12. The stacks 13 are each pushed onto a discharge conveyor 15 by means of a pusher 14 arranged laterally relative to the stack.

Arranged on both sides next to the conveyor 12 are contrarotating conveying segments 16 and 17, which is particularly shown by FIG. 1. Below each conveying segment 16 and 17 and coaxially thereto are contraoscillating holding segments 18 and 19. The packs 11 or rows of the packs 11 are laterally oriented by means of guides 20 and 21 arranged on both sides of the packs 11 or pack rows.

FIG. 2 of the drawing illustrates the mode of operation of the apparatus 10, especially of the conveying segments 16, 17 and the holding segments 18, 19. As can be seen, the conveying segments 16, 17 contrarotatingly grip the pack 11 or row of packs 11 with their front ends provided with curvatures 22 from underneath and lift said packs off the conveyor 12, as shown in representation b. The holding segments 18, 19 then pivot in opposite direction to the outside, so that the pack or pack row can be moved upwards past the holding segments 18, 19.

As soon as the conveying segments 16, 17 have lifted the pack 11 or row of packs 11 above the height of, the holding segments 18, 19, the latter pivot in opposite directions inwardly below the conveying segments 16, 17. Since the rotating conveying segments 16. 17 move outwardly and then downwardly as shown in representations c and d, the already lifted packs 11 finally come to rest on the holding segments 18, 19 which hold them there positively in a preset position.

At their back ends, the conveying segments 16, 17 are provided with slopes 26 led inwardly from their outer edges 25, so that the pack 11 or the row of packs 11 is deposited softly and gently on the holding segments 18, 19. Herewith, the stack 13 of packs 11 moves down slightly.

Representation d further shows that the continuously rotating conveying segments 16. 17 grip a new pack 11 and lift it in the afore-described way. The holding segments 18, 19 again pivot to the side in opposite directions, as already described above, and give way for the lifted packs 11 or row of packs. Herewith, the already lifted packs 11 of the stack 13 come to rest on the respective pack 11 moved up by the conveying segments 16, 17. At their inner ends, the holding segments 18, 19 are provided with slopes 24 led inwardly from the outer edges 23 which guarantee that the stack 13 of packs 11 slides off the holding segments 18, 19 pivoting away outwardly without impulsive movements in a soft and gentle manner onto the respective lowermost pack 11 lifted by the conveying segments 16, 17.

As soon as the conveying segments 16, 17 have continued their rotary motion to the point where they leave the region of the lowermost pack 11, the holding segments 18 19 once again hold the stack 13 of the packs 11. The aforedescribed process continues without interruption while the apparatus 10 is running. During operation, the stack 13 continuously moves up and down in a pulsating manner.

The stack 13 formed by the packs 11 is pushed onto the discharge conveyor 15 at regular intervals by means of the pusher 14. The packs 11 are then provided with wrappings to form a large bundle in a packing machine which is not shown in the drawing.

Figure 3:
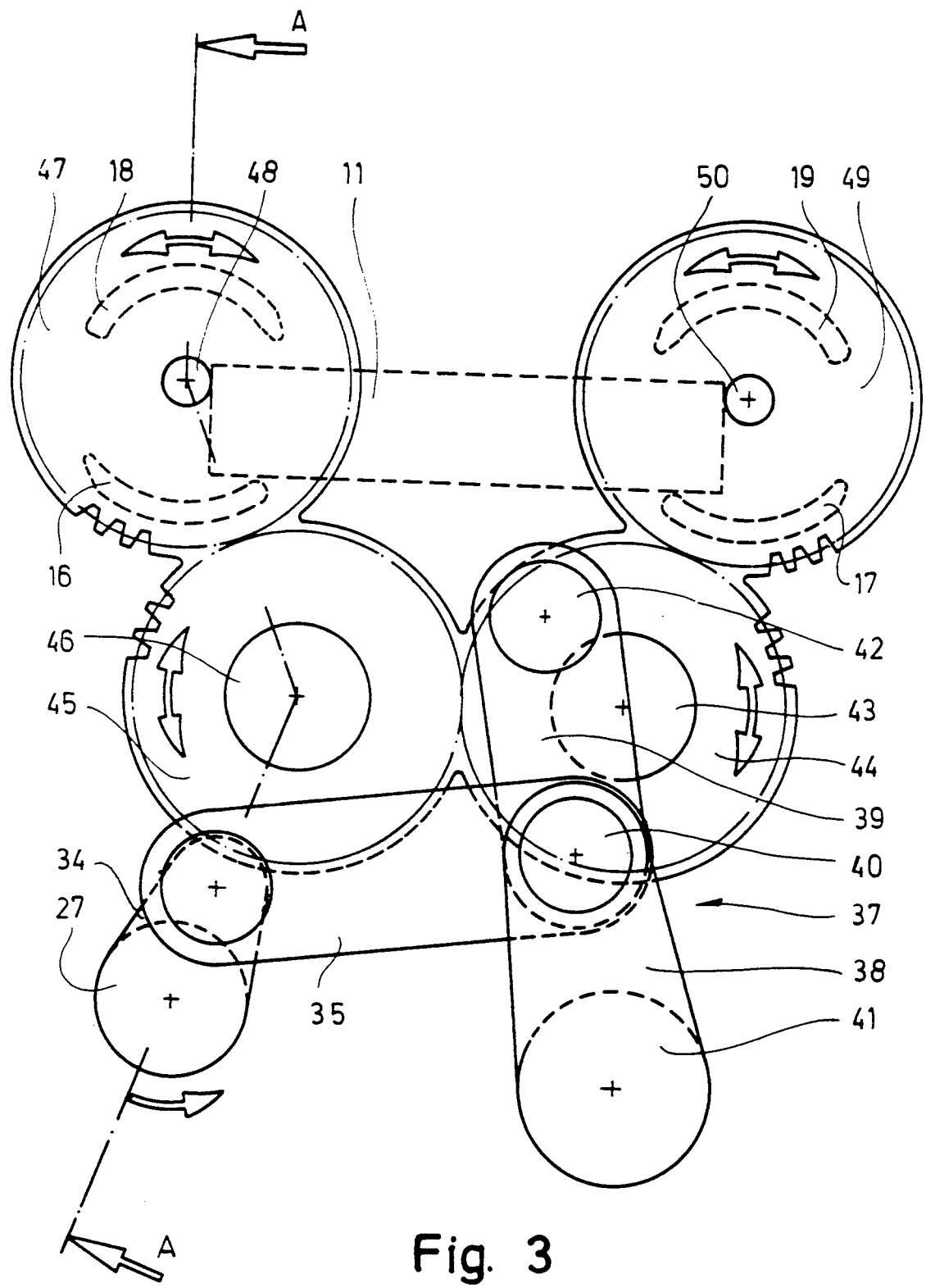
Figure 4:
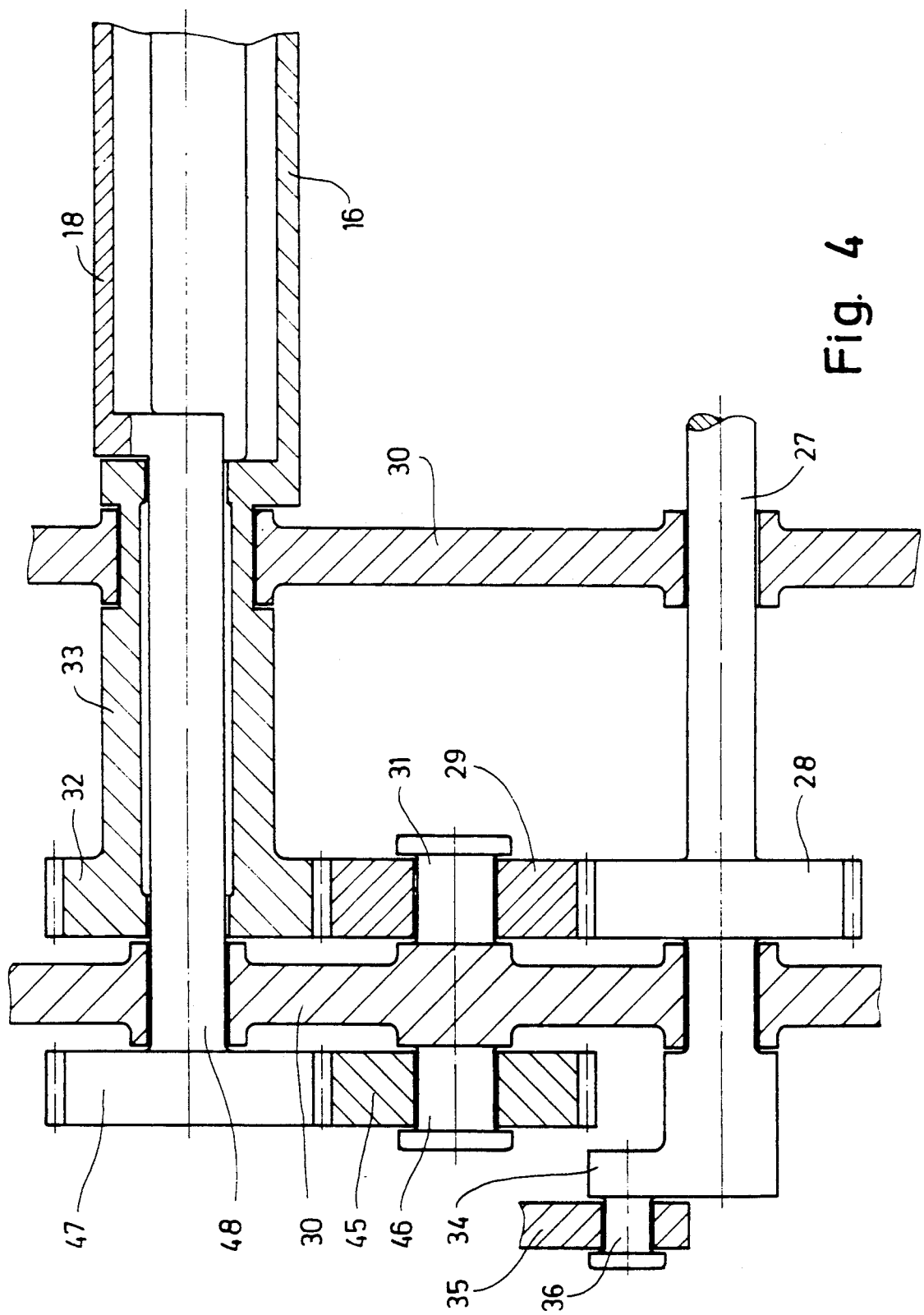

FIGS. 3 and 4 show that the conveying segments 16, 17 and the holding segments 18, 19 are driven by a continuously rotating main shaft 27. This main shaft 27 is itself driven by an electric driving motor not shown in the drawing.

A cogwheel 28, which is arranged non-rotatably on the main shaft 27, is in engagement with a cogwheel 29 which is pivoted on a bearing bolt 31 being fixed in the housing 30. Via this cogwheel 29, the main shaft 27 drives a cogwheel 32 of a tubular shaft 33, to which the conveying segment is connected. The conveying segment 16 therefore performs a continuous rotary motion like the main shaft 27.

A crank arm 34 is also fixed non-rotatably on the main shaft 27 and a coupler 35 is articulated on this crank arm 34 on a bearing bolt 36. The coupler 35 is connected to a double arm 37 being formed of two arms 38 and 39 and is articulated on said double arm via a hinged bolt 40. The hinged bolt 40 connects the coupler 35 and both arms of the double arm 37 in an articulated manner. Since the arm 38 of the double arm 37 is pivoted on a stationary journal 41 affixed to the housing 30 and since the arm 39 is connected to a bearing bolt 42 of a cogwheel 44 arranged on a stationary bearing journal 43, the movement of the main shaft 27 is transmitted via the coupler 35 such that the cogwheel 44 performs an oscillatory movement, as can be seen from FIG. 3 and FIG. 4.

FIG. 3 shows that the cogwheel 44 driven for oscillation is in engagement with a cogwheel 45 which is mounted on a bearing journal 46 affixed to the housing 30. As is shown in FIGS. 3 and 4, the cogwheel 45 is itself in engagement with a cogwheel 47 being arranged non-rotatably on a shaft 48 disposed coaxially within the tubular shaft 33. This shaft 48 carries the holding segment 18. FIG. 3 also shows that the cogwheel 44 driven for oscillation is furthermore in direct engagement with a cogwheel 49 which is arranged non-rotatably on a shaft 50 which is connected to the other holding segment 19.

The oscillatory motion of the cogwheel 44 therefore effects a the holding segments 18, 19 to be driven for oscillation as well. The interaction of the rotating conveying segments 16, 17 and the oscillating holding segments 18, 19 and their manner of arrangement effects the already described mode of operation of the apparatus 10.

The conveying segments 16, 17 and the holding segments 18, 19 may also be designed such that they are elongated in axial direction, as shown in FIG. 4, which makes the apparatus according to the invention suitable in particular for longer pack rows. This way, the apparatus can preferably also be used for producing paper tissue packs.

What is claimed is:

1. An apparatus for lifting from a conveyor (12) packs delivered on the conveyor (12) and for forming dischargeable stacks (13) from the packs (11), said apparatus comprising:

a pair of rotating conveying segments (16, 17) each conveying segment of the pair being rotatably mounted on opposite sides of the conveyor (12), for lifting a pack (11) from the conveyor (12) and adding the pack to a stack (13), each conveying segment (16, 17) revolving about an individual axis; and a pair of oscillating holding segments (18, 19), each holding segment of the pair also being rotatably mounted on said opposite sides of said conveyor (12), for holding a stack (13) of the packs (11), each holding element being associated with a corresponding one of said conveying segments (16, 17) and oscillating about said individual axis of said corresponding conveying segment at a lesser radial distance from said individual axis than said corresponding conveying segment;

wherein said conveying segments (16, 17) are arranged on tubular shafts (33) which are driven directly by a rotating main shaft (27) of the apparatus (10), and wherein said holding segments (18, 19) are arranged on shafts (48, 50) arranged coaxially within said tubular shafts (33), said shafts (48, 50) being driven for oscillation by said main shaft (27).

2. The apparatus according to claim 1, wherein said shafts (48, 50) with said holding segments (18, 19) arranged within said tubular shafts (33) are driven for oscillation by said main shaft (27) via a crank arm (34), an articulated coupler (35) and a double arm (37) which is articulated on a fixed journal (41) and is in engagement with an oscillating cogwheel (44).

3. The apparatus according to claim 2, wherein the oscillating cogwheel (44) is in direct engagement with a first cogwheel (49) on the shaft (50) of one holding segment (19) and directly drives said first cogwheel (49), and wherein said oscillating cogwheel (44) contrarotatingly drives a second cogwheel (47), on the shaft (48) of the other holding segment (18), via a third cogwheel (45) interposed between said oscillating cogwheel (44) and said second cogwheel (47).

4. An apparatus for lifting packs (11), delivered on a horizontal conveyor (12), and forming a dischargeable stack (13) packs (11), said apparatus comprising:
  disposed adjacent opposite outer lateral sides of the conveyor (12), a rotatable conveying segment (16, 17) for gripping and vertically lifting a first pack (11) from the conveyor (12), said conveying segments (16, 17) being located, in a beginning position, underneath a pack (11) on the conveyor, each conveying segment extending laterally inwardly of one of two opposite lateral edges of said first pack (11); and
  a pair of oscillatable driven holding segments (18, 19), each of the pair of holding segments assigned to one of said conveying segments (16, 17) and revolving about a common axis with its assigned conveying segment, for temporarily holding the stack (13) while said first pack (11) is fed to said stack (13) at the bottom thereof;
  wherein each of said conveying segments (16, 17) and said holding segments (18, 19) is an axially extending section of a cylindrical surface of a cylinder having said common axis as an axis of revolution; and
  wherein assigned pairs of said conveying segments (16, 17) and said holding segments (18, 19) are arranged coaxially so that said holding segments (18, 19) revolve about their respective common axes at a lesser radial distance from the common axes than said conveying segments (16, 17).

5. The apparatus according to claim 4, further comprising means for driving said conveying segments (16, 17) and said holding segments (18, 19) so that, at said beginning position, said holding segments (18, 19) pivot outwardly in opposite lateral directions to permit said first pack to pass upwardly between said holding segments, and the, pivot inwardly i opposite lateral directions whereby said first pack (11) comes to rest on said holding segments (18, 19), and so that said conveying segments (16, 17) continuously rotate in opposite directions; and
  wherein each of said conveying segments (16, 17) has, at a front end thereof, a curvature (22) which grips and lifts said first pack from underneath.

6. The apparatus according to claim 5, wherein each of said holding segments (18, 19) is provided at an inner end thereof with a sloped surface (24).

7. The apparatus according to claim 6, wherein each of the conveying segments (16, 17) is provided at a back end thereof with a sloped surface (26).

8. The apparatus according to claim 5, comprising pusher means (14) for pushing off of said holding segments (17, 18) a stack (13) formed of packs (11).

9. The apparatus according to claim 4, comprising pusher means (14) for pushing off of said holding segments (17, 18) a stack (13) formed of packs (11).

* * * * *